United States Patent
Katagiri

[11] Patent Number: 5,949,172
[45] Date of Patent: Sep. 7, 1999

[54] MOTOR WITH SALIENT POLE HAVING EXTENDING MAGNETIC FLUX COLLECTING PLATE

[75] Inventor: Masayuki Katagiri, Nagano, Japan

[73] Assignee: Kabushiki Kaisha Sankyo Seiki Seisakusho, Nagano, Japan

[21] Appl. No.: 09/071,123

[22] Filed: May 4, 1998

[30] Foreign Application Priority Data

May 2, 1997 [JP] Japan .................................. 9-114506

[51] Int. Cl.[6] .......................... H02K 23/04; H02K 23/40
[52] U.S. Cl. ...................... 310/218; 310/254; 310/261; 310/269; 29/596; 29/598
[58] Field of Search .............................. 310/51, 218, 269, 310/254, 260, 261, 67 R; 29/596, 598

[56] References Cited

U.S. PATENT DOCUMENTS

| | | | |
|---|---|---|---|
| 4,071,788 | 1/1978 | Martin et al. | 310/42 |
| 4,698,537 | 10/1987 | Byrne et al. | 310/168 |
| 4,730,136 | 3/1988 | Muller | 310/68 R |
| 5,194,775 | 3/1993 | Cooper | 310/260 |
| 5,220,228 | 6/1993 | Sibata | 310/254 |

FOREIGN PATENT DOCUMENTS 63-157651  6/1983  Japan .............................. H02K 23/04

*Primary Examiner*—Nestor Ramirez
*Assistant Examiner*—Tran N Nguyen
*Attorney, Agent, or Firm*—Sughrue, Mion, Zinn, Macpeak & Seas, PLLC

[57] ABSTRACT

In the motor (1), when a drive coil (17) is wound around a salient pole (114), the opening width of an armature core (11) is kept sufficiently large to be able to wind the drive coil (17) properly and easily. After the drive coil (17) is wound, a magnetic flux collecting plate (50) including a peripheral-direction extension portion (51) and an axial-direction extension portion (52) is mounted onto the outer peripheral surface (118) of a bow-shaped portion (117) of the salient pole (114.) In this mounting operation, two pawl-shaped positioning engagement portions (55) respectively formed in the magnetic flux collecting plate (50) are fitted into grooves (119) which are respectively formed in the upper and lower end faces of the armature core (11).

8 Claims, 11 Drawing Sheets

FIG.4(a) CONVENTIONAL MOTOR

FIG.4(b) PRESENT INVENTION

MOTOR WITH SALIENT POLE HAVING EXTENDING MAGNETIC FLUX COLLECTING PLATE

BACKGROUND OF THE INVENTION

1. Field of the Invention

The present invention relates to a motor and, in particular, to the structure of an armature for use in a motor.

2. Related Art

Figure 11A:
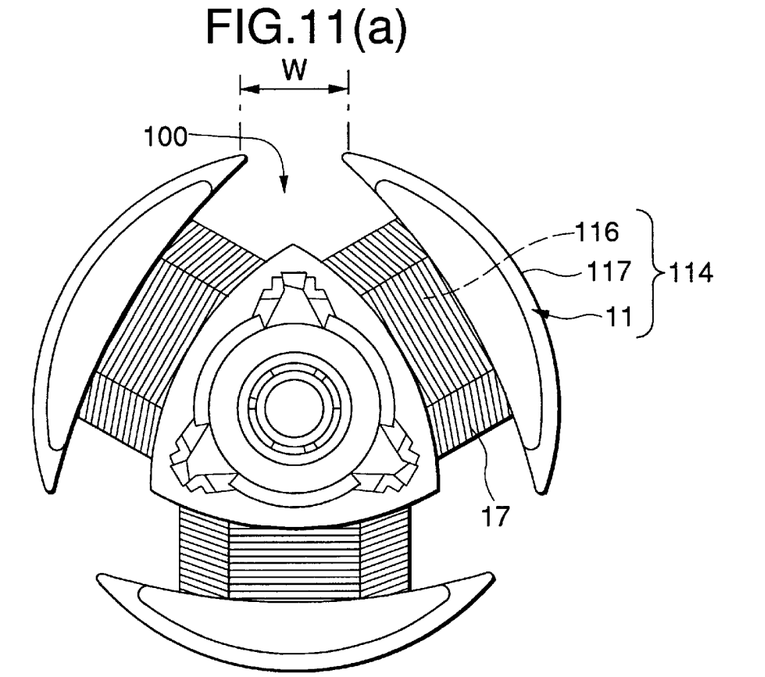

An armature core 11 for use in a motor, as shown in FIG. 11 (a), includes a plurality of salient poles 114 each of which is composed of a radially projecting arm portion 116 and a bow-shaped portion 117 spreading out on both sides at the leading end portion of the arm portion 116. An open slot 100 is formed between the mutually adjoining salient poles 114 and, using the open slot 100, a coil is wound around the arm portion 116 of each salient pole 114. For example, if the armature core 11 is rotated around a nozzle while guiding and drawing out a lead wire, then the lead wire can be wound around the arm portion 116 of the salient pole 114. In order to prevent the bow-shaped portion 117 from interfering with the movement of the nozzle in the present lead wire winding operation, there is secured a sufficiently wide opening width W as the open slot 100.

Figure 11B:
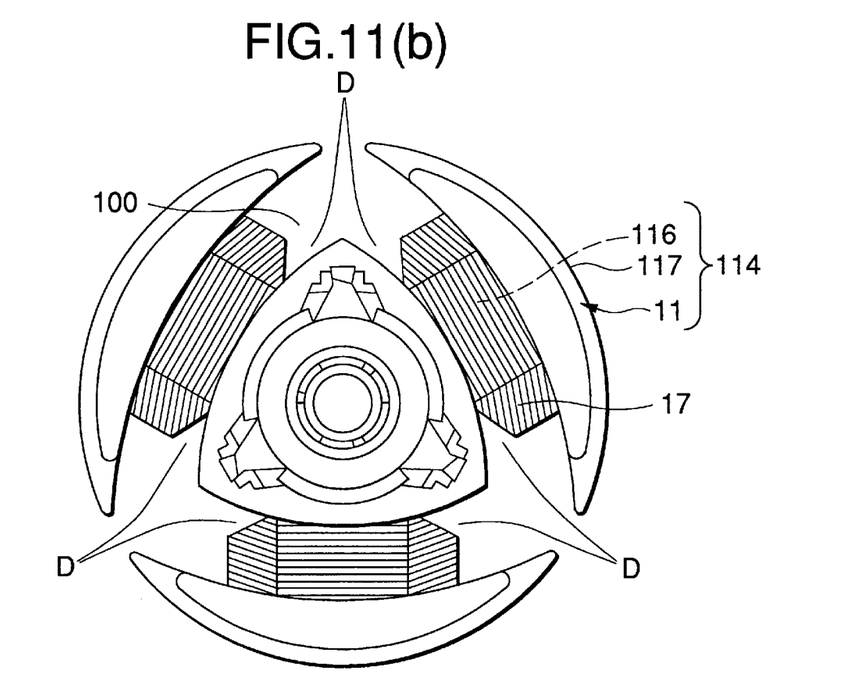

That is, in an operation to wind a drive coil 17, if, as shown in FIG. 11 (b), the opening width of the open slot 100 is too narrow, then the nozzle is not able to move to a sufficient degree, so that the drive coil 17 cannot be wound uniformly with respect to the arm portion 116 but the drive coil 17 is caused to cluster on the leading end side of the arm portion 116. As a result of this, there is produced a dead space D on the base end side of the arm portion 116; that is, not only the number of windings of the drive coil 17 is decreased in correspondence to the dead space D to thereby reduce the output of the motor, but also the windings of the drive coil 17 are caused to collapse, which results in the loosened drive coil 17.

Therefore, from the view point that the drive coil 17 should be wound properly, the opening width of the open slot 100 may be preferably increased to a large width but, in this case, there is raised a problem that the output characteristic of the motor is reduced by an amount corresponding to the increased width. That is, whether an armature 10 is rotated or a magnet is rotated, if the opening of the bow-shaped portion 117 is large, the magnetic flux collecting force of such opening portion is greatly decreased and the magnetic resistance thereof is greatly increased by an amount corresponding to the greatly decreased magnetic collecting force. As a result of this, the motor is caused to cog heavily, which interferes with the smooth and continuous rotation of the motor. As described above, in the conventional armature structure, the proper winding of the drive coil 17 and the smooth output of the motor provide an antinomic relation to each other that, if one of them is enhanced, then the other is worsened; that is, it is not possible to enhance both of them at the same time.

As a method for solving the above problem, in Japanese Patent Publication No. 63-157651 of Showa, there is disclosed an invention according to which a magnetic flux collecting plate (a magnetic flux collecting piece) is mounted on the outer peripheral surface of an armature core to thereby narrow the opening width of an open slot. However, with use of the disclosed invention, not only it takes time and labor to mount the magnetic flux collecting plate onto the armature core, but also the magnetic flux collecting plate cannot be extended any further in the axial direction thereof, which makes it impossible to enhance the motor output any further.

SUMMARY OF THE INVENTION

Accordingly, it is an object of the invention to provide a motor which is improved in the structure of an armature to be able not only to wind a drive coil in a proper condition but also to enhance the magnetic flux collecting function thereof, thereby being able not only to prevent the cogged motor but also to enhance the output of the motor sufficiently and easily.

According to an aspect of the invention, there is provided a motor comprising: an armature core including a plurality of salient poles each including a radially projecting arm portion and a bow-shaped portion formed in the leading end portion of said arm portion and spreading out on the two sides thereof;

a drive coil wound around said arm portion;

a magnet opposed to the outer peripheral surface of said armature core;

a magnetic flux collecting plate formed of a magnetic material mounted on the outer peripheral surface of said bow-shaped portion, said magnetic flex collecting plate including:

a peripheral-direction extension portion extending in the peripheral direction of said armature core from the two end portions of said bow-shaped portion in said peripheral direction;

an axial-direction extension portion extending in the axial direction of said armature core from at least one of the two end portions of said bow-shaped portion in said axial direction; and a positioning engagement portion bent toward said bow-shaped portion and engageable with said bow-shaped portion, wherein at least one of said magnet and said armature core is rotatable.

As has been described heretofore, in a motor according to the invention, the width of the opening of an armature when a drive coil is wound around a salient pole is set sufficiently large to be able to wind the drive coil properly and easily and, after the drive coil is wound, a magnetic flux collecting plate is mounted onto the outer peripheral surface of a bow-shaped portion of a salient pole, while the magnetic flux collecting plate is used to narrow the width of the opening of the armature core. Therefore, the magnetic flux collecting function of the armature can be enhanced to an extent corresponding to the thus narrowed opening of the armature, which prevents the motor from cogging and thus allows the motor to be rotated smoothly. Also, because the magnetic flux collecting plate extends out in the axial direction of the armature from the outer peripheral surface of the bow-shaped portion, the armature has a high magnetic flux collecting function and thus the motor output can also be enhanced. Further, the magnetic flux collecting plate includes a positioning engagement portion bent toward the bow-shaped portion and, simply by bringing the present positioning engagement portion into engagement with the bow-shaped portion, the positioning of the magnetic flux collecting plate with respect to the outer peripheral surface of the bow-shaped portion can be attained easily.

BRIEF DESCRIPTION OF THE DRAWINGS

FIG. 1 (a) is a semisection view of an armature, showing the basic structure of a motor according to the invention; and, FIG. 1 (b) is a plan view of the counter-output side end face thereof;

FIG. 3 (*a*) is a graphical representation of torque variations in a conventional motor; and, FIG. 3 (*b*) a graphical representation of torque variations in the motor according to the first embodiment 1 of the invention;

FIG. 4 (*a*) is a histogram of vibrations distribution in the conventional motor; and FIG. 4 (*b*) is a histogram of vibrations distribution in the motor according to the first embodiment 1 of the invention;

FIGS. 5 (*a*) and 5 (*b*) are explanatory views of an effect provided by the invention, showing that parts forming a motor can be used in common;

FIG. 6 (*a*) is a perspective view of a motor according to a second embodiment 2 of the invention, showing a state thereof in which a magnetic flux collecting plate is mounted on the outer peripheral surface of a bow-shaped portion of a salient pole; and, FIG. 6 (*b*) is a perspective view of the motor, showing how to manufacture an armature and a magnetic flux collecting plate used in the motor;

FIG. 7 (*a*) is a perspective view of a magnetic flux collecting plate used in a motor according to a third embodiment 3 of the invention; and, FIG. 7 (*b*) is a perspective-view of the structure of a conventional armature core used to obtain the same characteristic as the motor using the present magnetic flux collecting plate;

FIG. 8 (*a*) is a perspective view of a magnetic flux collecting plate used in a motor according to a fourth embodiment 4 of the invention; and, FIG. 8 (*b*) is a perspective view of the structure of a conventional armature core used to obtain the same characteristic as the motor using the present magnetic flux collecting plate;

FIG. 9 (*a*) is a perspective view of a motor according to a fifth embodiment 5 of the invention, showing a state thereof in which a magnetic flux collecting plate is mounted on the outer peripheral surface of a bow-shaped portion of a salient pole; and, FIG. 9 (*b*) is a perspective view of the motor, showing how to mount a magnetic flux collecting plate onto the outer peripheral surface of the bow-shaped portion of the salient pole;

FIG. 10 (*a*) is a perspective view of a motor according to a sixth embodiment 6 of the invention, showing a state thereof in which a magnetic flux collecting plate is mounted on the outer peripheral surface of a bow-shaped portion of a salient pole; and, FIG. 10 (*b*) is a side view thereof; and FIG. 11 (*a*) is a plan view of an armature used in a conventional motor; and, FIG. 11 (*b*) is a plan view of the armature, showing a problem found when the opening width of the armature, as it is, is narrowed in the conventional motor.

DETAILED DESCRIPTION OF THE PREFERRED EMBODIMENTS

Figure 1A:
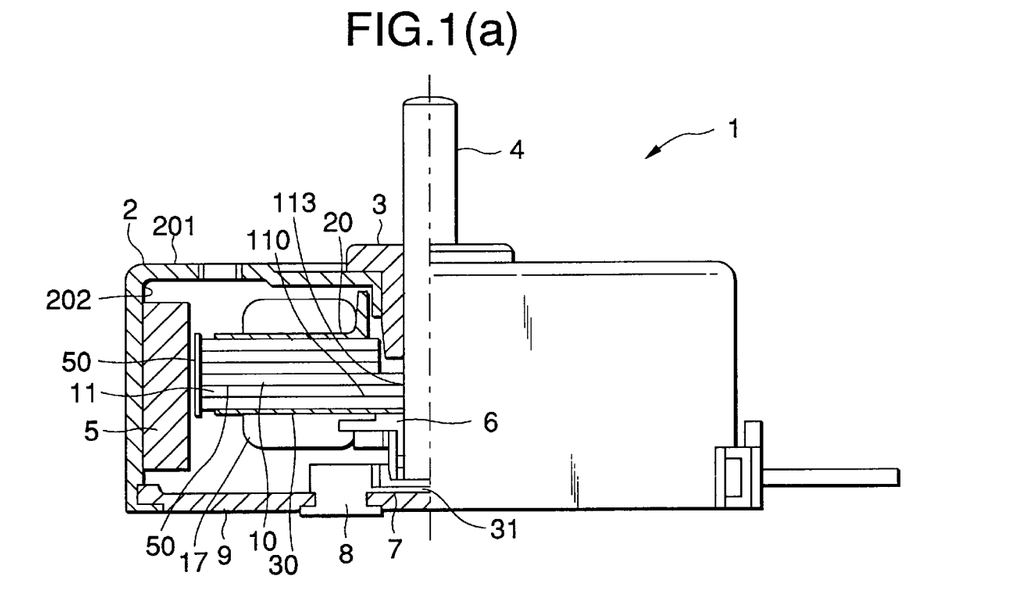
Figure 1B:
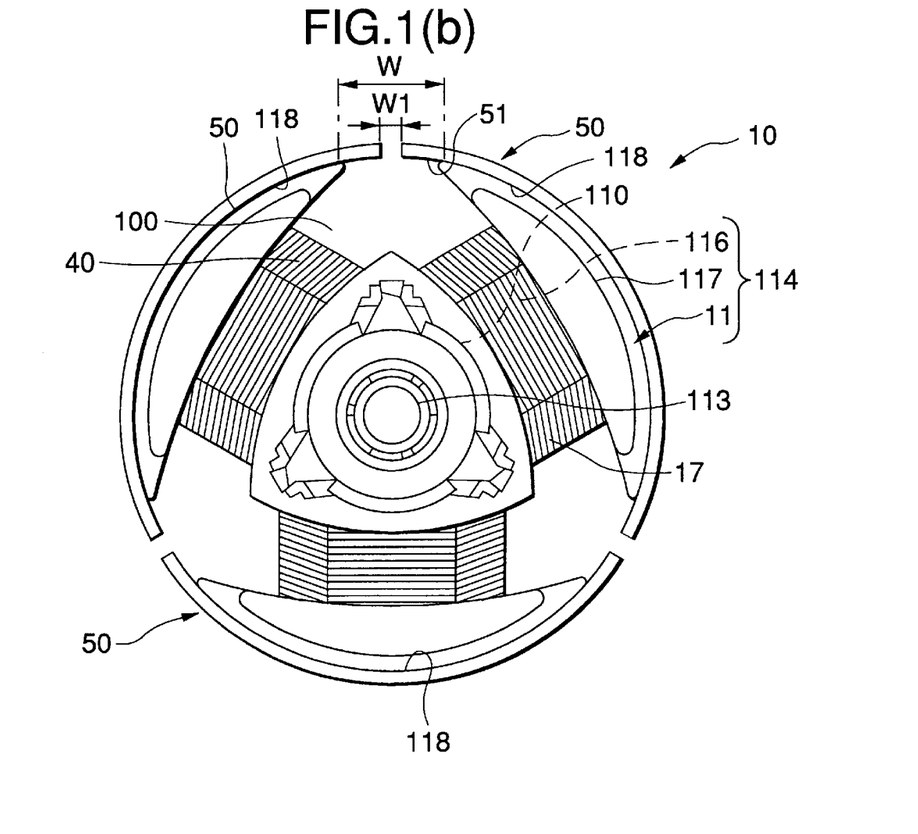

Now, description will be given below of the embodiments of a motor according to the invention with reference to the accompanying drawings. By the way, prior to the description of the respective embodiments, a structure used in common among the below-mentioned respective embodiments will be described with reference to FIG. 1.

(Whole Structure of Motor)

FIG. 1 (*a*) is a partially sectional view of a motor according to the invention. The present motor 1 is a small-sized motor of a thin type which includes a motor housing. The motor housing is composed of a cup-shaped cover case 2 and an end plate 9 which closes the opening of the cover case 2. A bearing 3 is fixed to the center of the bottom surface portion 201 of the cover case 2, while a motor shaft 4 is rotatably supported through the bearing 3. To the neighborhood of the central portion of the motor shaft 4 that extends in the longitudinal direction of the motor shaft 4 and is situated within the motor housing, there is fixed an armature 10 in such a manner that it can be rotated integrally with the motor shaft 4. On the inner peripheral surface 202 of the cover case 2, there is mounted a ring-shaped magnet 5 in such a manner that it is opposed to the outer peripheral surface of the armature 10 with a slight gap between them. On the end plate 9 side of the armature 10, a commutator 6 is mounted on the motor shaft 4. A brush 7 is held by a brush holder in such a manner that it is in contact with the contact surface of the commutator 6. The brush holder 8 is fixed to the end plate 9 closing the opening of the cover case 2. On the end plate 9, there is mounted a thrust bearing 31 which is used to support one end portion of the motor shaft 4.

The armature 10 includes an armature core 11 which is produced by laminating a plurality of core plates each formed of silicon steel.

As shown in FIG. 1 (*b*), the armature core 11 comprises a base portion 110 including a shaft hole 113 through which the motor shaft 4 extends, and three salient poles 114 Which respectively project radially from the base portion 110. Each of the three salient poles 114 includes an arm portion 116 extending radially from the base portion 110, and a bow-shaped portion 117 which is disposed in the leading end side of the arm portion 116 and spreads out on both sides of the peripheral direction of the arm portion 116. Insulators 20 and 30 for insulation (see FIG. 1 (*a*)) are applied to the armature core 11 respectively from above and below the same, while a drive coil 17 is wound around the arm portion 116 from above these insulators 20 and 30. By the way, when the insulators 20 and 30 are put on the armature core 11, then there are produced coil guide portions 40 respectively between the mutually adjoining salient poles 114. Therefore, there is no possibility that the drive coil 17 can move toward the other salient poles while the drive coil 17 is being wound around one of the salient poles 114 (in particular, the arm portions 116 thereof) of the armature core 11.

(Structure of Salient Pole Portion) In the thus structured armature 10, even when the drive coil 17 is wound around the arm portions 116 of the armature core 11, as has been previously described in the description of the prior art, there is used an open slot 100 which is formed between the two mutually adjoining salient poles 114. At the time when this coil winding step is carried out, since the opening width W of the open slot 100 is sufficiently wide, the drive coil 17 can be wound easily and in a proper condition without producing any dead space.

However, in view of the fact that, if the opening width W of the open slot 100 remains wide, then the magnetic resistance is large, according to the invention, in all of the respective embodiments that will be described hereinafter, after the drive coil 17 is wound around each of the salient poles 114, on the outer peripheral surface 118 of the bow-shaped portion 117 of the coil wound salient pole 114, there is mounted a magnetic flux collecting plate 50 formed of a magnetic plate such as a silicon steel plate or the like which is curved with a curvature equivalent to that of the present outer peripheral surface 118 of the bow-shaped portion 117. Here, because the magnetic flux collecting plate 50 includes a peripheral-direction extension portion 51 which extends in the peripheral direction further than the two peripherally extending end portions of the bow-shaped portion 117, the magnetic flux collecting plate 50 decreases the opening width W of the open slot 100 down to a width dimension W1. Thanks to this, in the motor 1 according to the invention, no cogging motion can be generated but the motor 1 can be rotated smoothly.

By the way, the magnetic flux collecting plate 50 is formed separately from the bow-shaped portion 117, that is, it can be freely mounted on and removed from the bow-shaped portion 117.

First Embodiment

Figure 2:
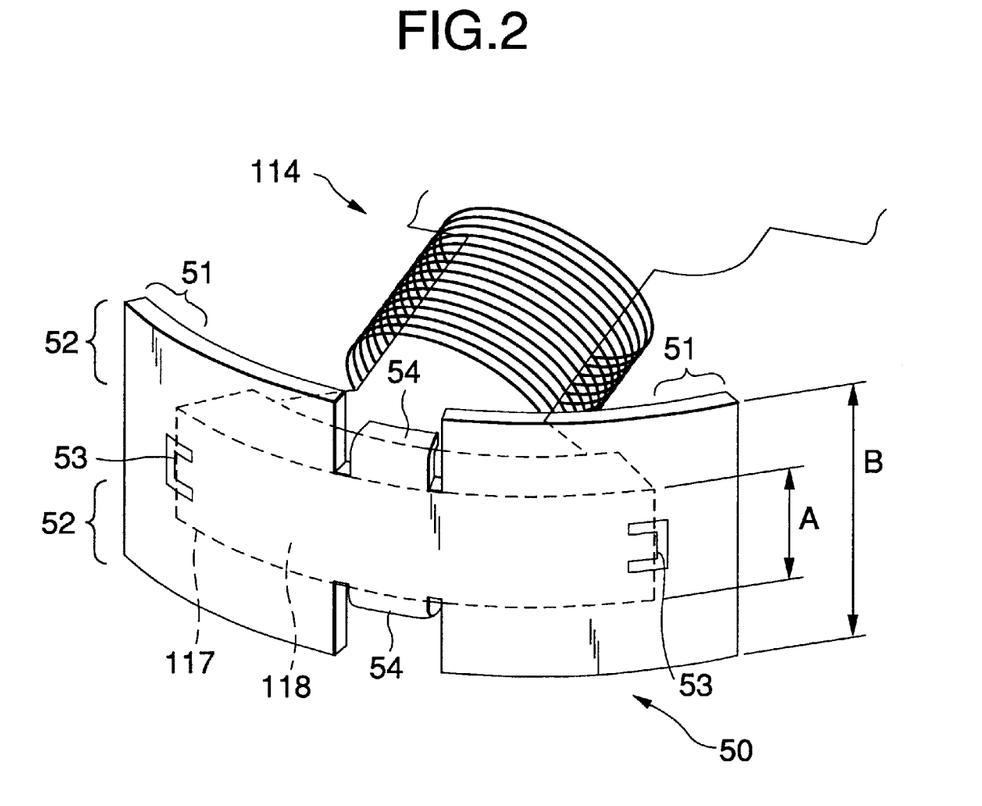
FIG. 2 is a perspective view of a motor according to a first embodiment 1 of the invention, showing a state thereof in which a magnetic flux collecting plate is mounted on the outer peripheral surface of a bow-shaped portion of a salient pole.

Now, FIG. 2 is a perspective view of the main portions (in particular, the salient poles and magnetic flux collecting plate) of an armature used in a motor according to the invention. By the way, in the following description, parts having common functions are given the same designations.

As shown in FIG. 2, in the motor according to the present embodiment, on the outer peripheral surface 118 of the bow-shaped portion 117, there is mounted a magnetic flux collecting plate 50 including a peripheral-direction extension portion 51 which extends in the peripheral direction further than the two peripherally extending end portions of the bow-shaped portion 117. The magnetic flux collecting plate 50 is formed of a magnetic plate. And, the width dimension B of the magnetic flux collecting plate 50 is set larger than the thickness dimension A of the bow-shaped portion 117 and, on the two axially extending sides of the magnetic flux collecting plate 50, there are respectively arranged axial-direction extension portions 52.

Also, the magnetic flux collecting plate 50 includes, as a positioning engagement portion which is bent on the bow-shaped portion 117 side and can be engaged with the bow-shaped portion 117, two pawl-shaped first engagement portions 53 respectively formed by cutting and raising the portions of the magnetic flux collecting plate 50, which are situated slightly inwardly of the two end portions thereof, toward the back surface side thereof. The two pawl-shaped first engagement portions 53 respectively extend from the two end edges of the bow-shaped portion 117 to the back side thereof to thereby position and fix the magnetic flux collecting plate 50 on the outer peripheral surface 118 of the bow-shaped portion 117. Therefore, without changing the structure of the armature core 11 which has been used conventionally, the peripheral-direction position of the magnetic flux collecting plate 50 on the outer peripheral surface 118 of the bow-shaped portion 117 can be decided.

Further, the magnetic flux collecting plate 50 includes, as another positioning engagement portion, two pawl-shaped second engagement portions 54 respectively formed in such a manner that the portions of the magnetic flux collecting plate 50 which are situated slightly inwardly of the upper and lower end portions thereof (that is, the portions of the magnetic flux collecting plate 50 that respectively correspond to the upper and lower end faces of the bow-shaped portion 117) are bent in part toward the back surface side of the magnetic flux collecting plate 50. And, the two pawl-shaped second engagement portions 54 are respectively engaged with the bow-shaped portion 117 in such a manner that they hold the bow-shaped portion 117 from above and below between them. Due to such engagement, the magnetic flux collecting plate 50 is positioned and fixed in the axial direction thereof on the outer peripheral surface of the bow-shaped portion 117.

Therefore, in the motor 1 according to the invention, as has been described with reference to FIG. 1 (*b*), since the width of the opening of the armature core is decreased by the magnetic flux collecting plate 50, no cogging motion can be generated in the motor 1 and, at the same time, because the area of the motor 1 opposed to the magnet is larger by an amount corresponding to the formation of the axially extending portions 52 in the magnetic flux collecting plate 50, the present armature core has a high magnetic flux collecting function and thus the motor 1 can provide a high output. Also, the magnetic flux collecting plate 50 includes on the bow-shaped portion 117 side thereof the first and second engagement portions 53 and 54 respectively bent in a pawl-shaped manner, that is, due to the engagement between these engagement portions and the bow-shaped portion 117, the magnetic flux collecting plate 50 can be positioned and fixed on the outer peripheral surface 118 of the bow-shaped portion 117. Therefore, after the magnetic flux collecting plate 50 is mounted, it may be used as the armature 10 as it is, or, after the magnetic flux collecting plate 50 is fixed to the bow-shaped portion 117 with adhesives or the like, it may be used as the armature 10.

Here, the magnetic flux collecting plate 50 may be structured such that it is already curved before it is mounted onto the outer peripheral surface 118 of the bow-shaped portion 117, or that it is a flat plate before it is mounted onto the outer peripheral surface 118 of the bow-shaped portion 117 but it is curved because it is mounted onto the outer peripheral surface 118 of the bow-shaped portion 117. As in the present embodiment, when the first engagement portions 53 extend entirely up to the back side of the bow-shaped portion 117 and can be engaged therewith, if the magnetic flux collecting plate 50 is structured such that it is deformed or curved when it is mounted onto the outer peripheral surface 118 of the bow-shaped portion 117, then the first engagement portions 53 can be engaged with the bow-shaped portion 117 strongly due to the shape restitutive force of the magnetic flux collecting plate 50. Owing to this, the magnetic flux collecting plate 50 can be fixed strongly to the outer peripheral surface 118 of the bow-shaped portion 117.

Also, the second engagement portions 54 may be structured in two different manners: that is, in one of them, the second engagement portions 54 are already bent on the back surface side of the magnetic flux collecting plate 50 before the magnetic flux collecting plate 50 is mounted onto the outer peripheral surface 118 of the bow-shaped portion 117; and, in the other, the second engagement portions 54 are bent on the back surface side of the magnetic flux collecting plate 50 after the magnetic flux collecting plate 50 is mounted onto the outer peripheral surface 118 of the bow-shaped portion 117. In the former structure, in more particular, if the second engagement portions 54 are already bent rather deeply on the back surface side of the magnetic flux collecting plate 50 before the magnetic flux collecting plate 50 is mounted onto the outer peripheral surface 118 of the bow-shaped portion 117 to thereby narrow a gap between the two second engagement portions 54 down to a dimension smaller than the thickness dimension of the armature core 11, then, in mounting the magnetic flux collecting plate 50 onto the armature core 11, simply by pushing the bow-shaped portion 117 into between the two engagement portions 54, the two pawl-shaped positioning engagement portions 54 are able to hold the bow-shaped portion 117 elastically between them due to the shape restitutive force thereof. This effect can be obtained by bending the two second engagement portions 54 in part respectively into the pawl-like shape.

Figure 3A:
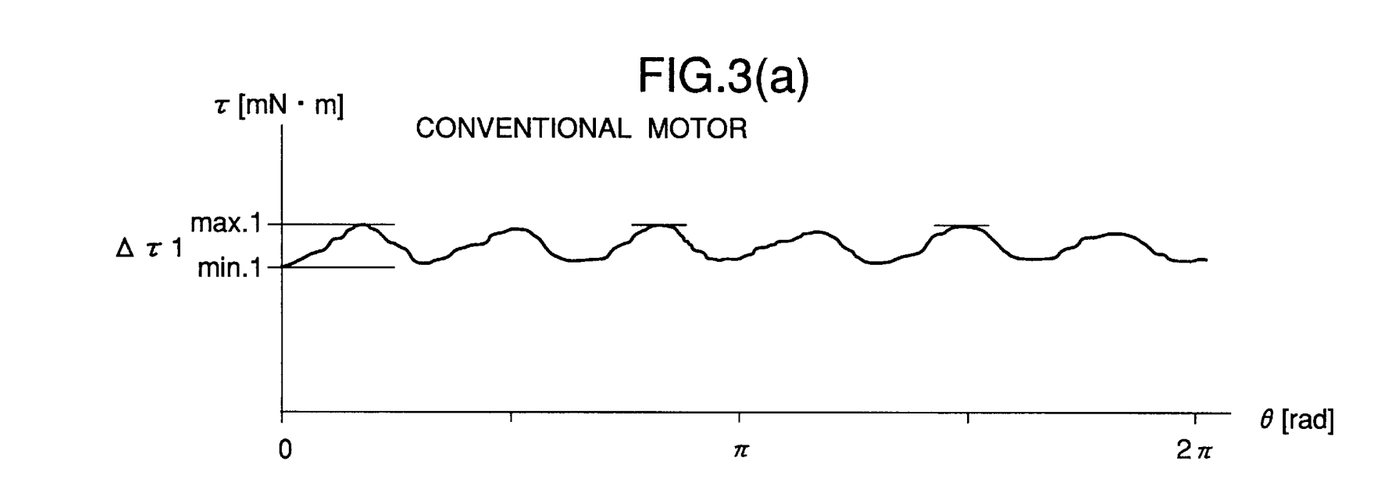
Figure 3B:
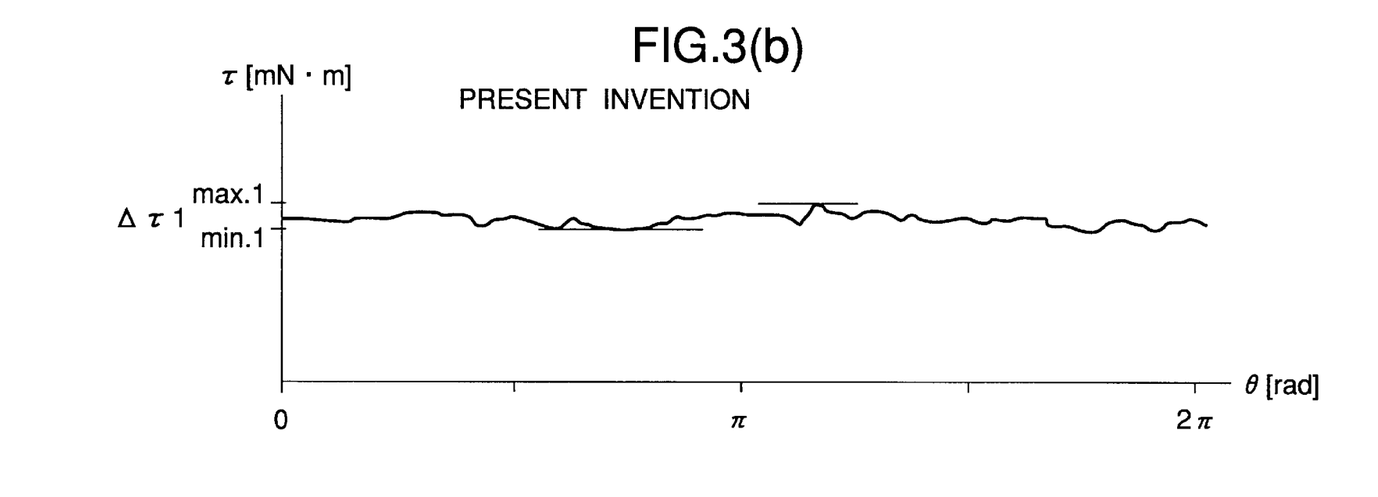

Here, torque variations are measured in the conventional motor, in which the width of the opening of the armature core 11 remains wide (see FIG. 11 (*a*)), and in the motor 1 according to the present embodiment; and, the measured results thereof are shown in FIGS. 3 (a) and (b). As can be understood from comparison of these figures, in the conventional motor, great torque variations are caused to occur at 6 positions per rotation of the armature 10 due to the cogging motion of the motor; and, on the other hand, in the motor 1 according to the present embodiment, since the opening width of the armature core 11 is narrowed, there disappear the torque variations caused by the above-mentioned cogging motion, so that the motor 1 can be rotated smoothly. In particular, a difference $|\Delta \tau 2|$ between the torque maximum value $\tau$ max. 2 and the torque minimum value $\tau$ min. 2 measured in the motor 1 according to the present embodiment is about 0.18 mN m(milinewton meter) which is about ½ with respect to a difference $|\Delta \tau 1|$ between the torque maximum value $\tau$ max. 1 and the torque minimum value $\tau$ min. 1 measured in the conventional motor. That is, with use of the motor 1 according to the present embodiment, smoother rotation can be obtained accordingly.

Figure 4A:
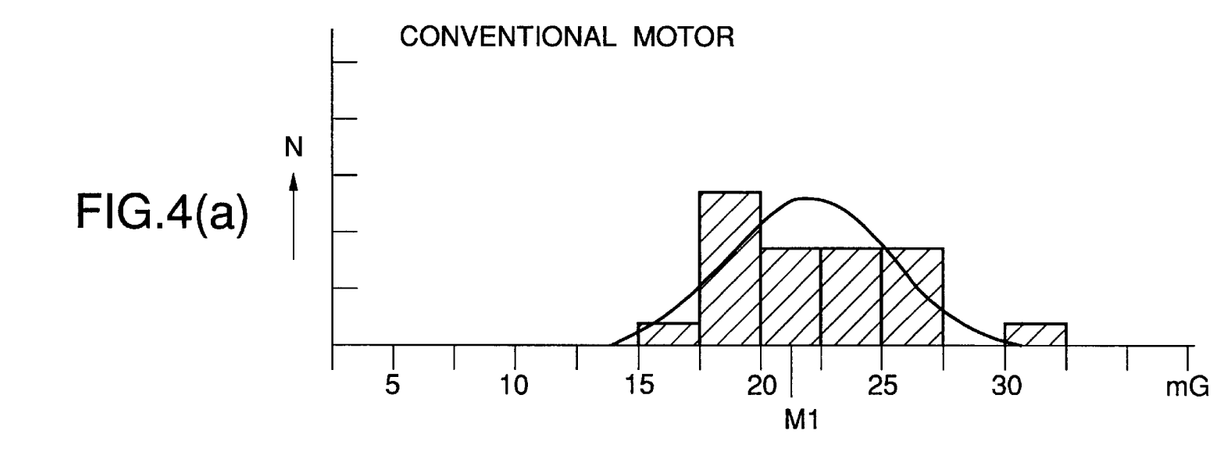
Figure 4B:
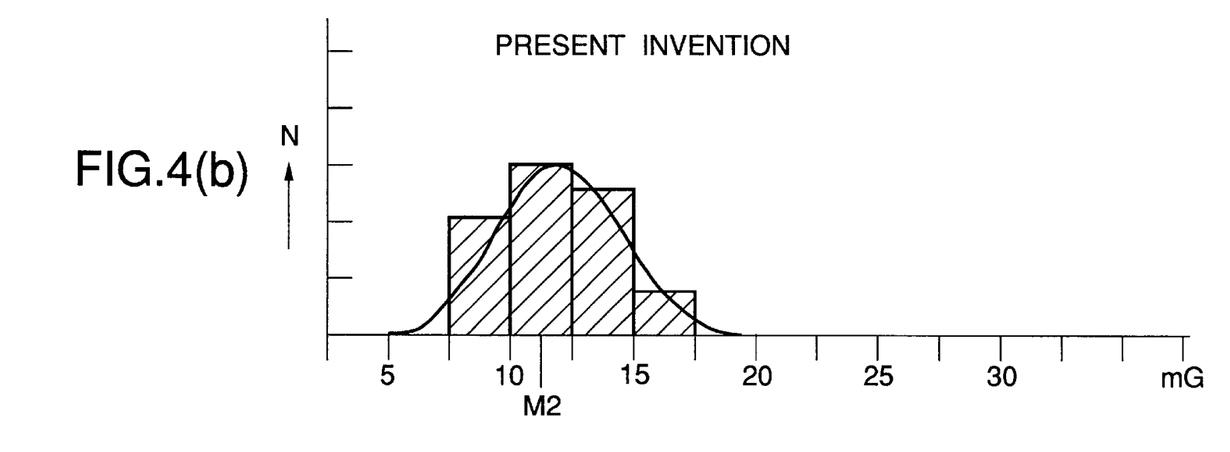

Also, for both of the conventional motor, in which the width of the opening of the armature core 11 remains wide, and the motor 1 according to the present embodiment, there were prepared 20 samples and there were measured, with respect to the respective samples, the vibration values (mG) that are produced when they are assembled into a drive device main body such as a CD (compact disk) or the like; and, the measured results are shown by histograms in FIGS. 4 (a) and (b). As can be understood from comparison of these figures, in the conventional motor, the mean value M1 of the vibrations is 22.000 mG; and, on the other hand, according to the present motor 1, since the opening width of the armature 11 is narrowed to thereby prevent the torque variations caused by the cogging motion of the motor, the mean value M2 of the vibrations thereof can be reduced down to 11.550 mG.

Figure 5A:
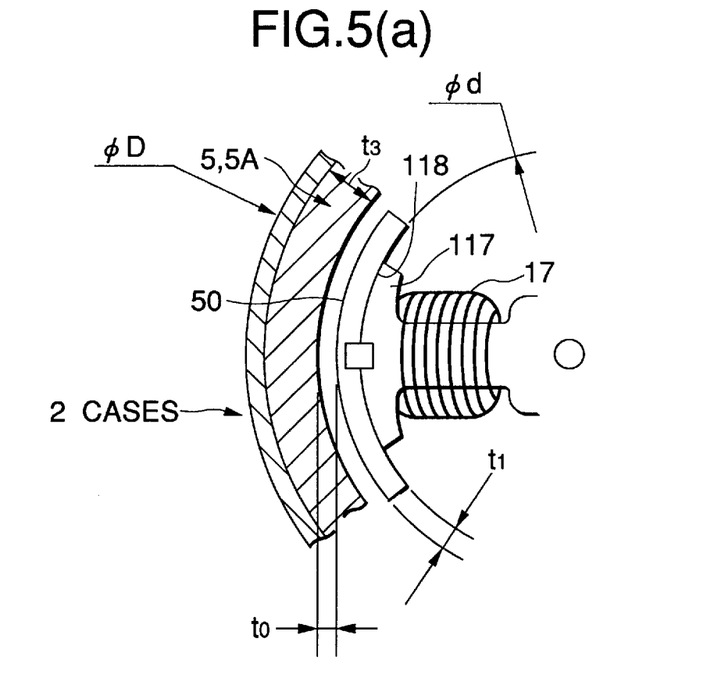
Figure 5B:
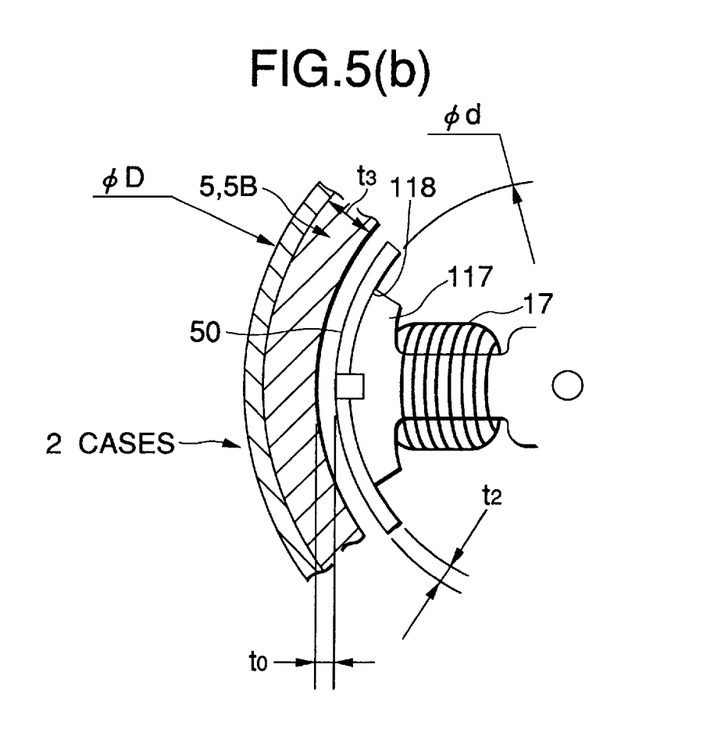

In structuring the motor 1, as respectively shown in FIGS. 5 (a) and (b), a magnet 5 can be used mainly in two forms: that is, one of them is a high output magnet 5A such as a neodymium-iron-boron magnet or the like and the other is a sintered magnet or a bond magnet 5. Between the two magnets 5A and 5B, as shown in FIG. 5 (a), the high output magnet 5A has a strong magnetic force but it is expensive, so that it is actually used in the form of a thin magnet having a thickness of t3. On the other hand, as shown in FIG. 5 (b), because the bond magnet 5B is inexpensive but is weak in the magnetic force, actually, it is used in the form of a relatively thick magnet having a thickness t4. Therefore, in the conventional motor structure, if there are used a cover case 2 having the same inside diameter ($\phi$ D) and an armature core 11 having the same outside diameter ($\phi$ d), then the dimension of a gap between the magnet 5 and the outer peripheral surface of armature core 11 varies according to the kind of the magnet 5, which makes it impossible to use the cover case 2 and armature core 11 in common. On the other hand, according to the present embodiment, since the magnetic flux collecting plate 50 is mounted on the outer peripheral surface 118 of the bow-shaped portion 117, even when the cover case 2 and armature core 11 having the same specifications are used, simply by changing the thickness of the magnetic flux collecting plate 50, the gap dimension between the magnet 5 and the outer peripheral surface 118 of the armature core 11 can be set as a constant value, that is, t0. In particular, when a thin high output magnet 5A is used, a thin magnetic flux collecting plate 50 having a thickness of t1 may be mounted on the outer peripheral surface 118 of the bow-shaped portion 117 and, when a thick high output magnet is used, a thin magnetic flux collecting plate 50 having a thickness of t2 may be mounted on the outer peripheral surface 118 of the bow-shaped portion 117, so that the gap dimension t0 between the inner peripheral end face of the magnet 5 and the outer peripheral surface of the armature core 11 (that is, the outer peripheral surface of the magnetic flux connecting plate 50) can be set as a constant value.

Second Embodiment

In the above-mentioned first embodiment, there is shown the structure in which the magnetic flux collecting plate 50 includes, as the positioning engagement portions, the first engagement portions 53 for positioning the magnetic flux collecting plate 50 in the peripheral direction thereof as well as the second engagement portions 54 for positioning the same in the axial direction thereof. On the other hand, according to the present embodiment, a single kind of engagement portions are used to position the magnetic flux collecting plate 50 in the peripheral direction thereof as well as in the axial direction thereof.

Figure 6A:
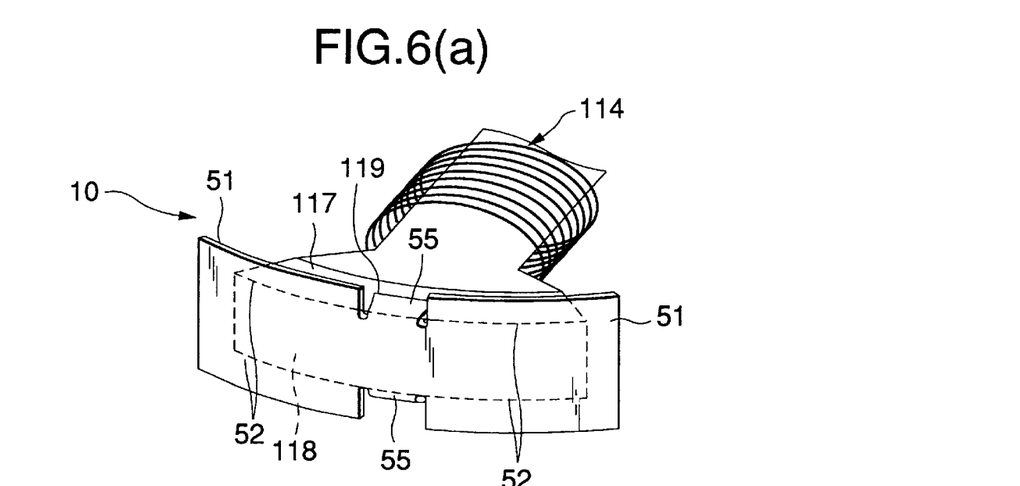

In particular, as shown in FIG. 6 (a), according to the present embodiment, there are formed grooves 119 respectively in the upper and lower end faces of the bow-shaped portion 117 of the armature core 11 and, into these grooves 119, there are completely fitted two pawl-shaped positioning engagement portions 55 which are respectively formed in the portions of the magnetic flux collecting plate 50, which are situated slightly inwardly of the upper and lower ends of the magnetic flux collecting plate 50, and are bent in part toward the back surface side of the magnetic flux collecting plate 50. Also, the leading end side of the positioning engagement portion 55 spreads out in width and the shape of the groove 119 is set such that it corresponds to the shape of the engagement portion 55. Therefore, if the positioning engagement portion 55 is fitted into the groove 119, then it can never be removed even if the magnetic flux collecting plate 50 is pulled toward the outer peripheral side thereof.

Figure 6B:
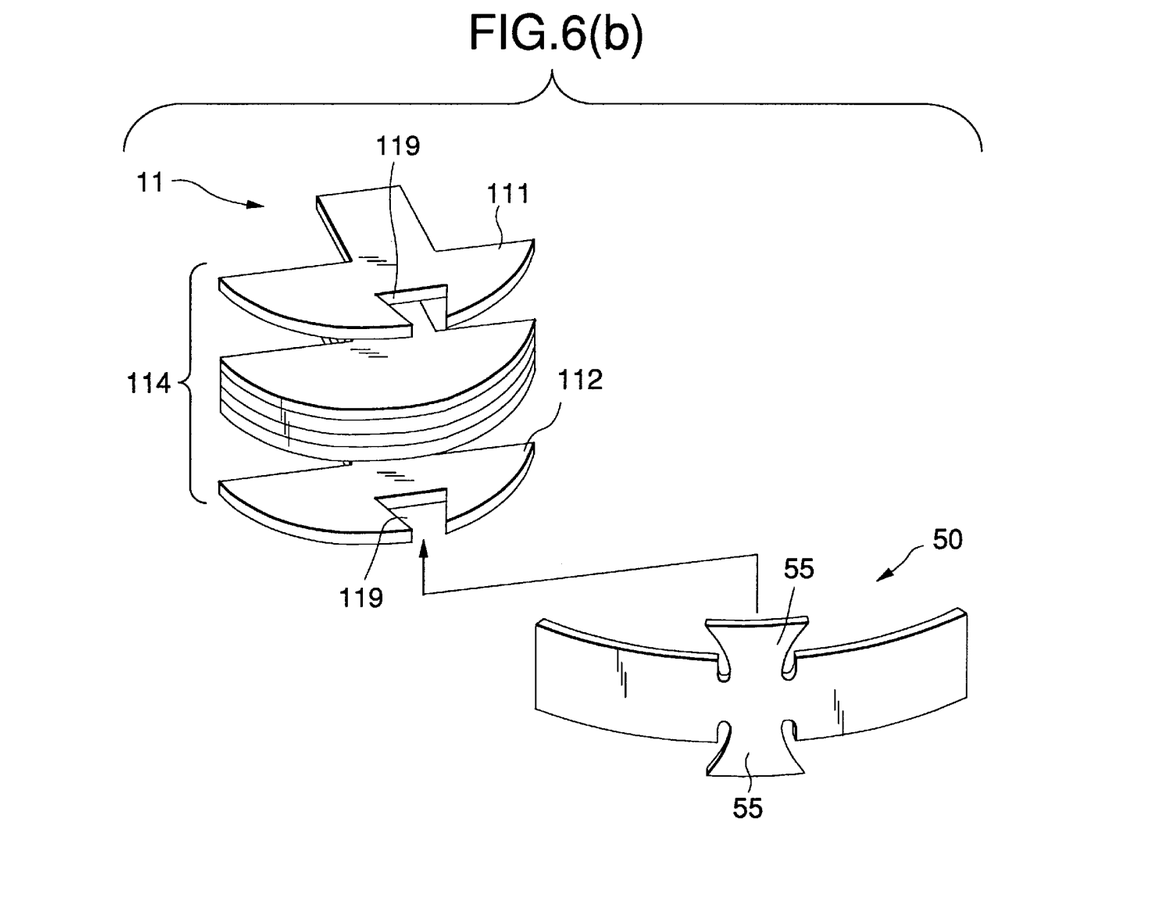

To form the grooves 119 each having the above-mentioned shape in the upper and lower surfaces of the bow-shaped portion 117, as shown in FIG. 6 (b), when a plurality of core plates are piled up on each other to thereby form the armature core 11, there may be formed in the upper-most core plate 111 and lower-most core plate 112 notches which can be used as the grooves 119. Also, to form the positioning engagement portions 55 in the magnetic flux collecting plate 50, when a magnetic plate is punched out by a press, there may be left in the upper and lower edges of the magnetic flux collecting plate 50 projections which can be used as the positioning engagement portions 55, and the projections may be then bent toward the magnetic flux collecting plate 50 as shown by an arrow E in FIG. 6.

With use of the thus structured armature 10, since the magnetic flux collecting plate 50 including a peripheral-direction extension portion 51 and an axial-direction extension portion 52 is mounted on the outer peripheral surface 118 of the bow-shaped portion 117, there is provided a high magnetic flux collecting function, with the result that there can be obtained similar effects to the previously described first embodiment 1, for example, there can be provided a high rotation characteristic and a high motor output characteristic. Also, according to the present embodiment, since the positioning engagement portions 55 formed in the magnetic flux collecting plate 50 are arranged in a state that they hold the armature core 11 between them from above and below within the groove 119, the positioning engagement portions 55 not only can position and fix the magnetic flux collecting plate 50 in the axial direction thereof but also can be respectively fitted into the groove 119 to thereby be able to position and fix the magnetic flux collecting plate 50 in the peripheral direction thereof as well. That is, simply by fitting the positioning engagement portions 55 of the magnetic flux collecting plate 50 into the groove 119, the magnetic flux collecting plate 50 can be mounted onto the outer peripheral surface 118 of the bow-shaped portion 117, thereby being able to provide another advantage that the present embodiment can offer a high operation efficiency.

Third Embodiment

Figure 7A:
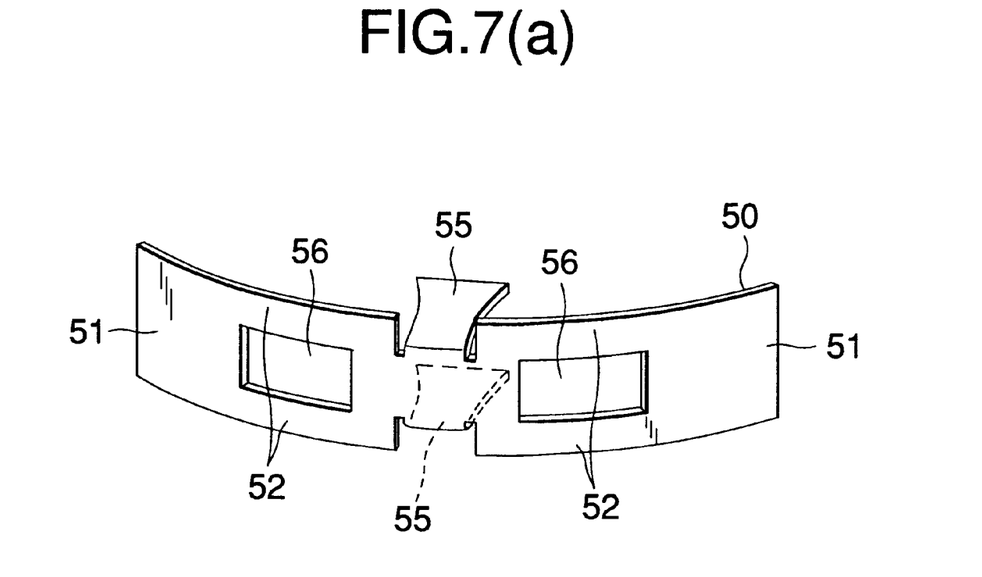

In a motor according to the above-mentioned second embodiment 2, as shown in FIG. 7 (a), in the magnetic flux collecting plate 50 mounted on the outer peripheral surface 118 of the bow-shaped portion 117, there may be previously formed two rectangular through holes 56 and, as shown in FIG. 6 (a), there may be formed in the magnetic flux collecting plate 50 through holes 56 used to reduce the cogging motion of the motor, whereby, when the magnetic flux collecting plate 50 is mounted onto the outer peripheral surface 118 of the bow-shaped portion 117, part of the outer peripheral surface 118 of the bow-shaped portion 117 can be exposed through the through hole 56.

If the motor is structured in this manner, then even in the portion thereof where the magnet 5 (see FIG. 1 (a)) and magnetic flux collecting plate 50 are disposed opposed to each other, the positions thereof where the through holes 56 are formed are slightly reduced in the magnetic flux collecting function. As a result of this, around the armature core 11, the magnetic flux collecting function can be averaged and thus the cogging motion caused by the opening of the armature core 11 can be reduced accordingly.

Figure 7B:
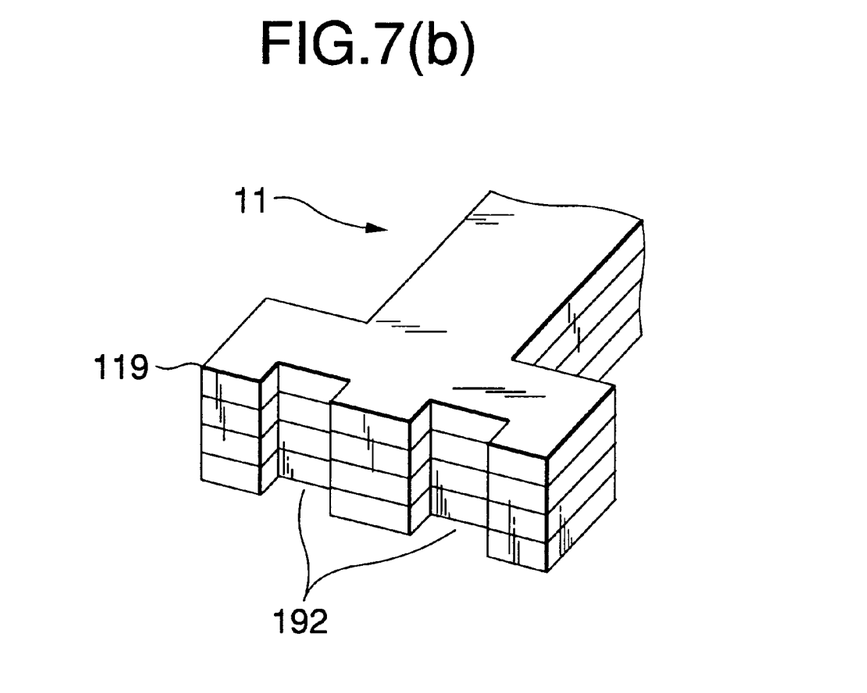

In structuring an armature core having the above-mentioned action, conventionally, as shown in FIG. 7 (b), there is used a method in which, in the respective core plates 191 that forms the armature core 11, there are formed notches 192 which respectively extend inwardly from the outer peripheral edges of the core plates. On the other hand, as in the present embodiment, with use of the structure that the through holes 56 are formed in the magnetic flux collecting plate 50 and the magnetic flux collecting function of the portion of the magnetic flux collecting plate 50 where the through holes 56 are formed can be reduced by the present through holes 56, the magnetic flux collecting plate 50 shown in FIG. 7 (a) may simply be mounted onto the armature core 11 having a generally used structure. For this reason, the present embodiment has an advantage that the armature core 11 can be used in common among various kinds of motors.

Fourth Embodiment

Figure 8A:
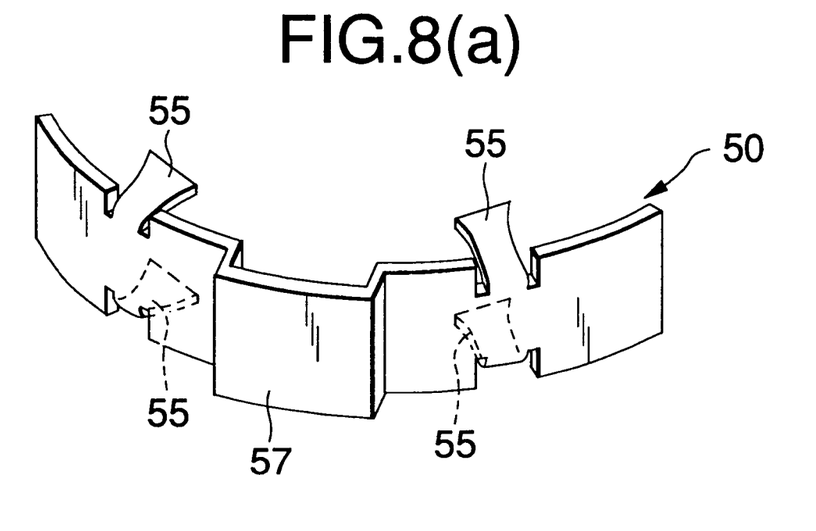

As shown in FIG. 8 (a), in the magnetic flux collecting plate 50, in more particular, in the central portion thereof in the peripheral direction thereof, there may be formed a rectangular-shaped projecting portion 57 by bending a magnetic plate to thereby narrow a gap between the magnetic flux collecting plate 50 and magnet 5 (see FIG. 1 (a)) by an amount equivalent to the thus formed projecting portion 57, in order to be able to enhance the magnetic flux collecting efficiency of the armature. In this case, because the projecting portion 57 is formed in the peripheral-direction central portion of the magnetic flux collecting plate 50, on both sides of the projecting portion 57, there are formed such positioning engagement portions 55 as have been previously described herein with reference to FIGS. 6 (a) and (b). On the other hand, although not shown, instead of the grooves 119 formed in the respective central portions of the upper and lower end faces in the armature core 11 shown in FIGS. 6 (a) and (b), there are formed, in the upper and lower end faces of the armature core 11, in particular, at the positions thereof that correspond to the positioning engagement portions 55, two grooves 119 into which the positioning engagement portions 55 can be fitted respectively.

Figure 8B:
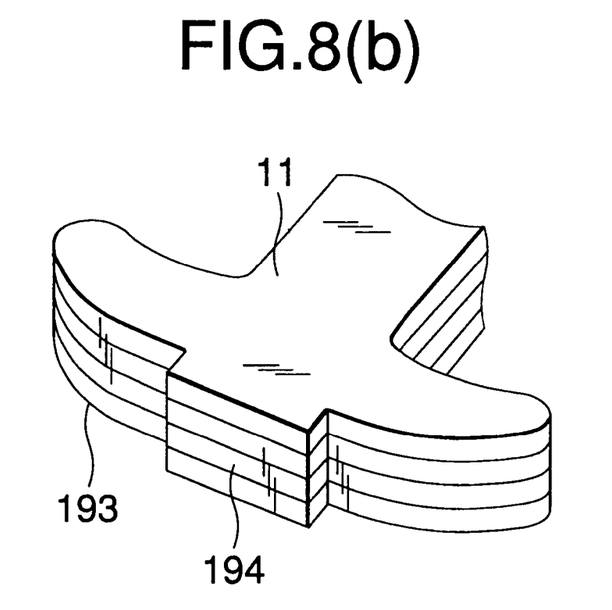

In structuring an armature core having the above-mentioned action, conventionally, as shown in FIG. 8 (b), there is used a method in which, in the respective outer peripheries of the core plates 193 that form the armature core 11, there are formed projecting portions 194 which respectively project in a rectangular manner from the outer peripheral edges of the core plates. On the other hand, as in the present embodiment, with use of the structure that the projecting portions 57 are formed in the magnetic flux collecting plate 50, the magnetic flux collecting plate 50 shown in FIG. 8 (a) may simply be mounted onto the armature core 11 having a generally used structure. For this reason, the present embodiment is advantageous in that the armature core 11 can be used in common among various kinds of motors.

Fifth Embodiment

Figure 9A:
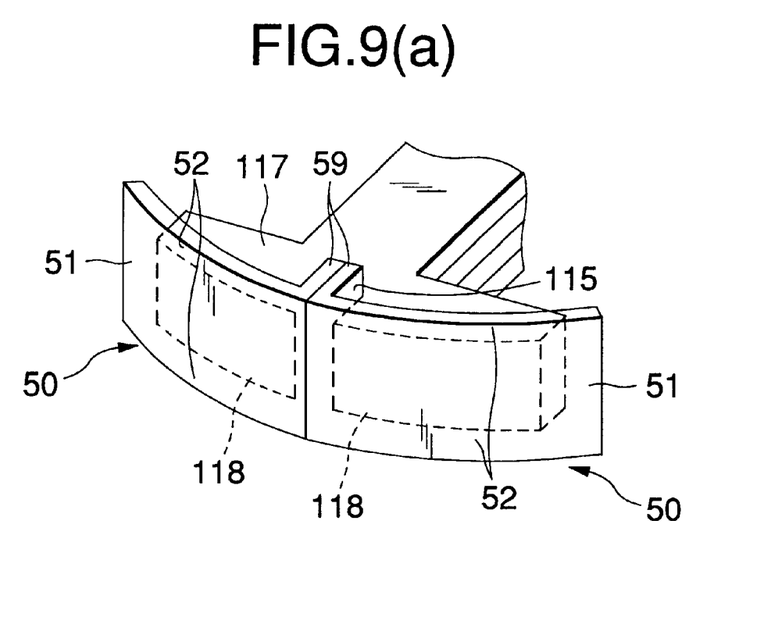
Figure 9B:
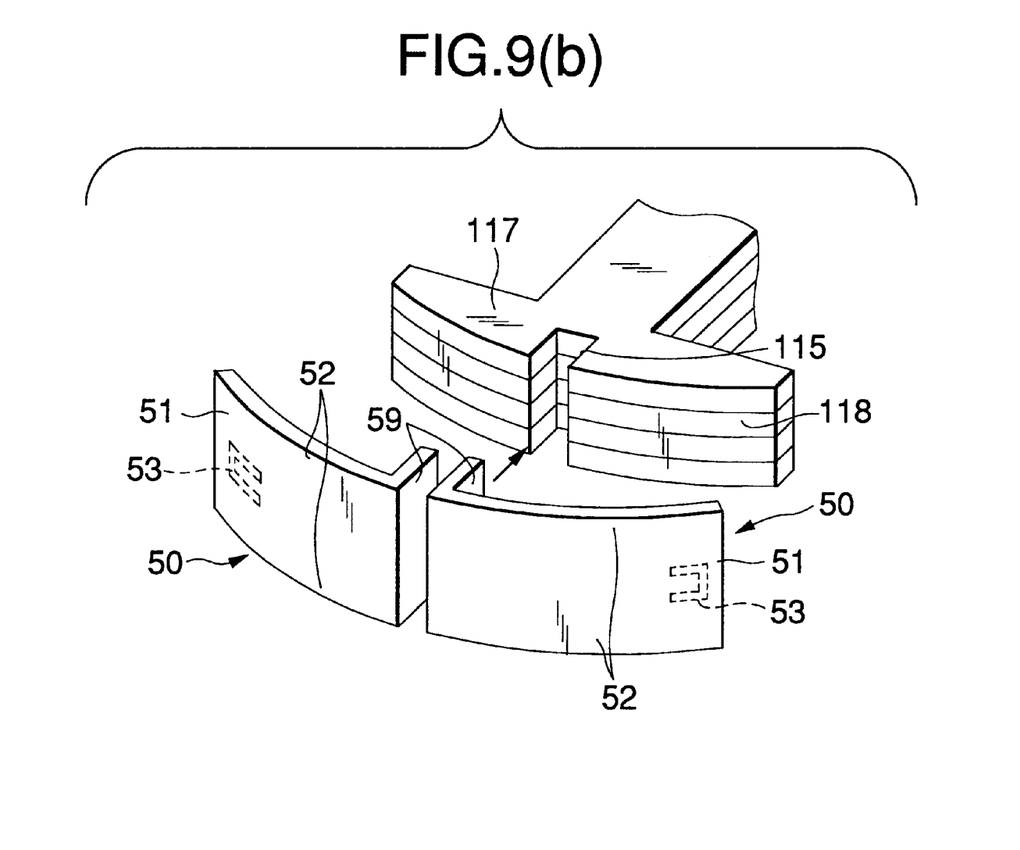

Now, in the present embodiment 5, as shown in FIGS. 9 (a) and (b), 2 pieces of magnetic flux collecting plates 50 are used for one bow-shaped portion 117, while the two magnetic flux collecting plates 50 are fixed by means of a groove 115 formed in the outer peripheral surface 118 of the bow-shaped portion 117. That is, each of the two magnetic flux collecting plates 50 is structured such that the end portion thereof is bent toward the back surface thereof and the thus bent portion forms a positioning engagement portion 59; and, the width of the groove 115 formed in the outer peripheral surface 118 of the bow-shaped portion 117 is set in such a manner that the two mutually superimposed positioning engagement portions of the two magnetic flux collecting plates 50 can be fitted into and fixed to the groove 115.

Even when the two magnetic flux collecting plates 50 are used in this manner, if they are mounted onto the outer peripheral surface 118 of the bow-shaped portion 117, then the other end portions of the two magnetic flux collecting plates 50 respectively provide peripheral-direction extension portions 51 which respectively extend in the peripheral direction from the bow-shaped portion 117. This makes it possible to narrow the opening of the armature core 11. Also, since the width dimension of the magnetic flux collecting plate 50 is larger than the thickness dimension of the armature core 11, each of the two magnetic flux collecting plates 50 includes an axial-direction extension portion 52 which extends out in the axial direction. For this reason, according to the present embodiment, since the armature core 11 has a high magnetic flux collecting function, similarly to the previously described embodiment 1, there is provided an advantage that the motor output can be improved.

By the way, as shown by a one-dot chained line in FIG. 9 (b), in the magnetic flux collecting plates 50, there may be formed two pawl-shaped positioning engagement portions 53 which are respectively cut and raised from the slightly inwardly portions of the two ends of the magnetic flux collecting plates 50 toward the back surface sides thereof, and the two positioning engagement portions 53 may be respectively moved from the two ends of the bow-shaped portion 117 onto the back side thereof to thereby position and fix the magnetic flux collecting plates 50 to the outer peripheral surface 118 of the bow-shaped portion 117 in the peripheral direction thereof.

Sixth Embodiment

Figure 10A:
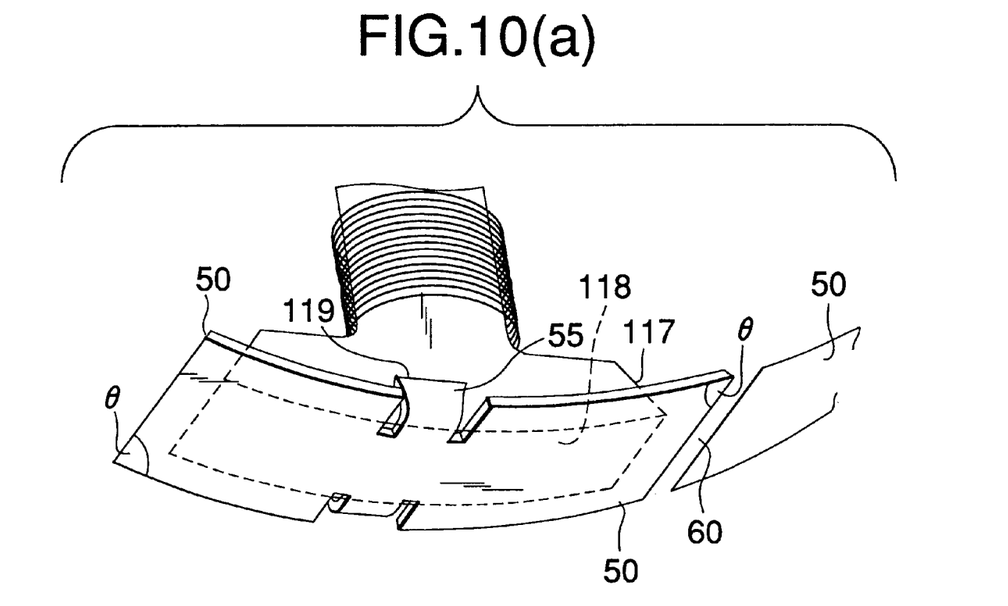
Figure 10B:
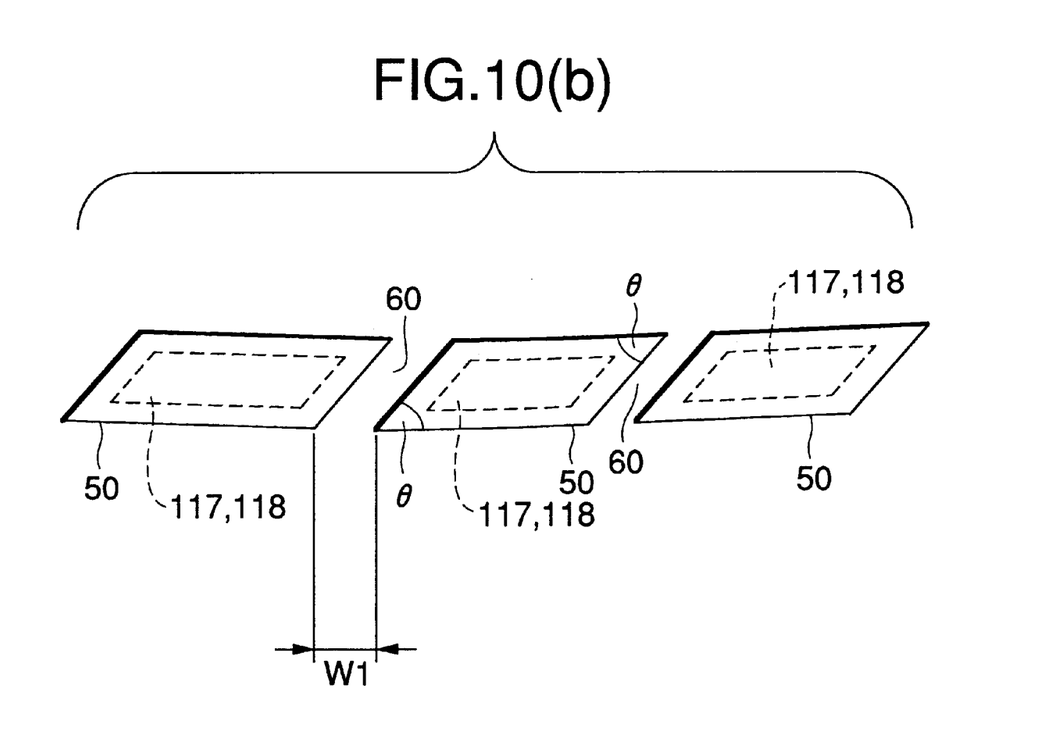

In all of the above-mentioned embodiments, a gap formed between the two mutually adjoining magnetic flux collecting plates 50 extends straight in the axial direction of the armature core 11. However, like such magnetic flux collecting plates 50 as shown in FIGS. 10 (*a*) and (*b*), the two end edges of the magnetic flux collecting plate 50 may be cut obliquely at an angle of θ (θ<90° C.) and thus a skew-shaped gap 60 may be formed. With use of this structure, even if the opening width W1 is the same as in the structure in which the gap formed between the two mutually adjoining magnetic flux collecting plates 50 extends straight in the axial direction of the armature core 11, since the variations in the magnetic resistance thereof are smooth, the occurrence of the cogging motion in the motor can be prevented with more accuracy. In addition, the skew-shaped gap can be formed in the armature 11 simply by punching out the two end edges of the magnetic flux collecting plate 50 obliquely, which eliminates the need to pile up the core plates on each other while shifting them when the armature core 11 is manufactured. That is, with use of the present structure, the armature core 11 can be manufactured easily.

Another Embodiments

By the way, in all of the above-mentioned embodiments, the magnetic flux collecting plate 50 includes the axial-direction extension portions 52 on both sides in the axial direction from the outer peripheral surface of the bow-shaped portion 117. However, this is not limitative but the magnetic flux collecting plate 50 may include the extension portion 52 only one side in the axial direction thereof.

Also, in all of the above-mentioned embodiments, the width of the peripheral-direction gap formed between the respective end portions of the two mutually adjoining magnetic flux collecting plates may be preferably one half or less than that of the peripheral-direction gap formed between the respective end portions of the two mutually adjoining bow-shaped portions. Use of such structure not only can enhance the magnetic flux collecting function of the armature further but also can enhance the motor output.

As has been described heretofore, in a motor according to the invention, the width of the opening of an armature when a drive coil is wound around a salient pole is set sufficiently large to be able to wind the drive coil properly and easily and, after the drive coil is wound, a magnetic flux collecting plate is mounted onto the outer peripheral surface of a bow-shaped portion of a salient pole, while the magnetic flux collecting plate is used to narrow the width of the opening of the armature core. Therefore, the magnetic flux collecting function of the armature can be enhanced to an extent corresponding to the thus narrowed opening of the armature, which prevents the motor from cogging and thus allows the motor to be rotated smoothly. Also, because the magnetic flux collecting plate extends out in the axial direction of the armature from the outer peripheral surface of the bow-shaped portion, the armature has a high magnetic flux collecting function and thus the motor output can also be enhanced. Further, the magnetic flux collecting plate includes a positioning engagement portion bent toward the bow-shaped portion and, simply by bringing the present positioning engagement portion into engagement with the bow-shaped portion, the positioning of the magnetic flux collecting plate with respect to the outer peripheral surface of the bow-shaped portion can be attained easily.

What is claimed is:

1. A motor comprising:
    an armature core including a plurality of salient poles each including a radially projecting arm portion and a bow-shaped portion formed in a leading end portion of said arm portion and spreading out on two sides thereof;
    a drive coil wound around said arm portion;
    a magnet opposed to an outer peripheral surface of said armature core;
    a magnetic flux collecting plate formed of a magnetic material mounted on an outer peripheral surface of said bow-shaped portion, said magnetic flux collecting plate including:
       a circumferential-direction extension portion extending, in a circumferential-direction of said armature core, from two circumferential end portions of said bow-shaped portion;
       an axial-direction extension portion extending, in an axial direction of said armature core, from at least one of two axial end portions of said bow-shaped portion; and
       a positioning engagement portion bent toward said bow-shaped portion and engageable with said bow-shaped portion,
    wherein at least one of said magnet and said armature core is rotatable.

2. A motor as claimed in claim 1, wherein said positioning engagement portion is defined by a structure such that said positioning engagement portion positioning said magnetic flux collecting plate not only in the circumferential direction thereof but also in the axial direction thereof.

3. A motor as claimed in claim 1, wherein said magnetic flux collecting plate is removably mounted on said bow-shaped portion.

4. A motor as claimed in claim 2, wherein said positioning engagement portion includes a first pawl-shaped engagement portion for positioning said magnetic flux collecting plate in the circumferential direction thereof, and a second pawl-shaped engagement portion for positioning said magnetic flux collecting plate in the axial direction thereof.

5. A motor as claimed in claim 1, wherein engagement grooves are respectively formed in upper and lower end faces of said bow-shaped portion, and when said positioning engagement portions are respectively fitted into said engagement grooves, said positioning engagement portions positioning said magnetic flux collecting plate both in the circumferential direction thereof and in the axial direction thereof.

6. A motor as claimed in claim 1, wherein said magnetic flux collecting plate includes a through hole through which the outer peripheral surface of said bow-shaped portion can be exposed.

7. A motor as claimed in claim 1, wherein a circumferential-direction gap formed between end portions of mutually adjoining magnetic flux collecting plates, said gap having a width being equal to or less than one half a width of a circumferential-direction gap formed between the end portions of mutually adjoining bow-shaped portions.

8. A motor as claimed in claim 1, wherein said magnetic flux collecting plate is defined by a structure such that said magnetic flux collecting plate forms a skew-shaped gap between two adjoining magnetic flux collecting plates.

\* \* \* \* \*